United States Patent Office

Re. 26,855
Reissued Apr. 14, 1970

26,855

METHOD OF PRODUCING CATHODES FOR HOLLOW CATHODE LAMPS OF SPECTROSCOPIC ANALYZERS

Kazuo Yasuda, Makoto Ousawa, and Hisasuke Takeuchi, Hitachi-shi, Japan, assignors to Kabushiki Kaisha Hitachi Seisakusho, Tokyo-to, Japan, a Japanese joint-stock company No Drawing. Original No. 3,164,466, dated Jan. 5, 1966, Ser. No. 242,891, Dec. 7, 1962. Application for reissue Dec. 13, 1966, Ser. No. 661,132
Claims priority, application Japan, Dec. 9, 1961, 36/44,614
Int. Cl. B22f *3/26*
U.S. Cl. 29—182.1 25 Claims

Matter enclosed in heavy brackets [ ] appears in the original patent but forms no part of this reissue specification; matter printed in italics indicates the additions made by reissue.

*ABSTRACT OF THE DISCLOSURE*

*A hollow emissive cathode for a spectroscopic analyzer which emits several characteristic line spectra equal in kind and number to the individual elemental metals contained in the sintered mixture from which the cathode is made; extreme mutual diffusion in such mixture is thereby kept relatively small.*

This invention relates to a new method of producing hollow cathodes to be used as light sources of spectroscopic analyzers depending on the atomic absorption method and other like apparatuses.

A spectroscopic analyzer depending on the atomic absorption method is to be understood herein as being of the following description. In the use of this analyzer, the sample substance to be analyzed is transformed into a soluble substance such as, for example, a salt, and an aqueous solution thereof is prepared and introduced in an atomized form into the flame of a gas burner so as to vaporize the sample. Then, when light projected from a light source consisting of a hollow cathode lamp passes through the said flame, this light is absorbed at a certain wavelength determined by the sample substance. The quantity of this absorption is detected by a spectroscopic apparatus having such components as prisms and detecting devices and is measured from the difference between the intensity of light received directly from the light source and that of the light which has passed through the sample. From this measurement, the concentration of the element contained in the sample being analyzed is computed.

By the above-described method, precise analysis can be performed rapidly without any influence due to other co-existing elements, even when the sample content is extremely small. In general, for this type of light source, one which has a high intensity at a certain wavelength is considered to be necessary. Although an ordinary white light source is an intense light source over a wide range of wavelengths, since its light intensity is feeble in the narrow wavelength range necessary for analysis and is deficient in actual practice, the best line spectrum to use is that of the substance to be measured; for example, if the substance to be measured is copper, the best line spectrum to use is that of copper.

The hollow cathode lamp has been developed in view of the above-presented considerations.

It is an object of the present invention to provide a cathode for a hollow-cathode lamp satisfying several conditions, the principal conditions being as listed below.

(1) The hollow cathode should have an intense line spectrum at the time of discharge and, at the same time, should, itself, exhibit a bright line of low absorption.

(2) The cathode should have good electrical conductivity and thermal conductivity and should be free of local heating at the time of discharge.

(3) The cathode material should be such that it can be subjected to such fabrication processes as cutting into the required configuration and drilling.

(4) The cathode should have a long working life.

(5) In actual practice, the line spectra of two or more elements should be obtainable from one lamp.

Heretofore, for this type of cathode, cathodes which do not melt when their temperatures rise during use up to 500 to 600 degrees C., for example, cathodes of Cu, Fe, Ni, Cr, Co, Au, Ag, Rh, Pd, Pt, Ta, and Ti, have been used, the cathode in each case consisting of one kind of single, [pure] *elemental* metal. However, although such a cathode satisfies the first four of the afore-listed requirements, it has been incapable of meeting the fifth requirement, that is, the requirement of being capable of obtaining line spectra of several kinds of elements from a single lamp.

For this purpose, heretofore, in the analysis of several kinds of constituents, it has been necessary to change the lamp in each case. Furthermore, in the case of metals of low melting points, such as Pb, Sn, and Zn, the use of a high current causes a rise in the lamp temperature to 500 to 600 degrees C. due to the Joule heat, whereby the electrode made from a metal of low melting point melts. For this reason, the current must be kept low, wherefore the luminous intensity is thereby reduced, and a satisfactory bright line cannot be obtained.

As one measure of eliminating the above-described disadvantages, the present inventors considered the use of an alloy for the cathode and made a [fusible] *melted* alloy from zinc and copper. However, this alloy was found to have the following disadvantageous features. With this alloy, two kinds of line spectra are obtained. Moreover, when the alloying proportions are made to be 15 percent Zn and 85 percent Cu for the sake of machinability, the zinc becomes a solid solution in the copper, the bright line for Zn becoming remarkably weak, and a satisfactory line spectrum cannot be obtained. Furthermore, the intensity of the *zinc* spectral line is *observed* [caused] to drop in a short time. *This may be caused* by the evaporation of the Zn in the surface layer. A [fusible] *melted* alloy of 50 percent Zn and 50 percent Cu was found to be extremely brittle and difficult to machine. As a result of research, a method of producing a cathode has been found by application of powder metallurgy which fulfills all of the afore-listed requirements, and in which, moreover, even an alloy of low melting point metals can be used.

The essential characteristic of the method of producing cathodes according to the present invention is its procedure consisting of pulverizing at least two elemental metals selected from such metals as Cu, Fe, Ni, Cr, Au, Ag, Pd, Bi, Sb, Pb, Sn, Zn, Pt, Ta, Ti, Mn, B, [and] Si, *Mo, and Co* mixing and molding the metals in pulverized form, heating the molded metal powders to transform then into a sintered article, and forming a cathode from this sintered article.

By the method of this invention, since the raw materials are in powder form, the molded article is in a mixture state of at least two kinds of materials. When this article is heated, the said *at least* two materials mutually diffuse in some cases, but by selecting a suitable heating temperature, it is possible to increase the mechanical strength of the article while maintaining the mixture state of the particles of the elemental metals. Accordingly, if two elemental metals have been used, two bright lines can be readily obtained. *If three elemental*

*metals are used, three bright lines can be obtained.* Furthermore, by the method of this invention, the article can be molded directly into the configuration of the electrode, and the machining of produce is greatly facilitated. Among elemental metals, such metal with short lives as readily evaporating Zn and Cd or such metals of low melting points as Pd and Sn can also be used, practically, as cathode metals as will be described hereinafter in an example.

Heretofore, an electrical contact material produced by pulverizing tungsten and adding thereto such elements as silver and copper has been manufactured. Such a practice, as a production method, is similar to the method of the present invention. However, the aim in this known practice is to utilize the fact that tungsten, because of its extremely high melting point, is a metal by which it is difficult to obtain a fusible metal material and the fact that the high melting point of tungsten provides resistance against arcing, and this practice is fundamentally different in nature from the present invention which has the object of obtaining at least two bright-line spectra *by a single hollow cathode.*

In order to indicate still more fully the nature of the present invention, the following examples of typical procedure are set forth, it being understood that these examples are presented as illustrative only, and that they are not intended to limit the scope of the invention. Throughout these examples, the term "alloy" is used to mean a combination of two or more metals in a mixture state, that is, the term includes a composite substance, a substance wherein diffusion between the metals has advanced because of heating, and, in some cases, a sintered substance wherein compounds have been formed.

EXAMPLE 1

15 percent of Pb powder and 85 percent copper powder were mixed by means of mixing machines such as a ball mill and then compression molded. The molded powder mixture was then sintered for one hour at a temperature of from 600 to 650 degrees C. to produce an electrode to be used as a cathode.

EXAMPLE 2

Three mixtures, respectively consisting of 30 percent Sn and 70 percent Cu, 40 percent Sn and 60 percent Cu, and 50 percent Sn and 50 percent Cu, all in powder form, were mixed in mixing machines such as a ball mill, and each mixture was compression molded. Then each molded mixture was sintered at 200 to 350 degrees C., whereupon three cathodes were obtained.

EXAMPLE 3

Three mixtures, respectively consisting of 30 percent Zn and 70 percent Cu, 40 percent Zn and 60 percent Cu, and 50 percent Zn, and 50 percent Cu, all in powder form, were mixed in mixing machines such as a ball mill, and then each mixture was compression molded. Then each molded mixture was sintered at 300 degrees C., whereupon three cathodes were obtained.

In each of the sintered copper alloys produced according to the foregoing Examples 1, 2 and 3, the Cu assumed a sponge-like structure, and the interstices thereof were filled with the other metal, Pb, Zn, or Sn. For this reason, when the electrode temperature became 500 to 600 degrees C., and the Pb or Sn melted, or the Zn evaporated, the electrode did not change its shape. Accordingly, the intensities of both bright line spectra were amply high, and satisfactory bright line spectra for each of the metals Cu, Pb, Sn, and Zn were obtained.

The above-mentioned sponge-like structure is produced not only by Cu powder but also by powders of such metals as Fe, Ni, Co, and Cr.

EXAMPLE 4

45 percent of Fe powder, 30 percent of Ni powder, and 25 percent of Cu powder were mixed by means of a ball mill and then compression molded. Next, the article thus compression molded was sintered for one hour at 900 degrees C. The sintered material was machined into an electrode. As a result of using this electrode, the intensities of the spectrum lines of the three elements were substantially equal and were amply high. In all respects, a satisfactory electrode was obtained.

In all of the foregoing examples, sintered alloys containing copper powder were produced. The inclusion of copper powder affords the advantages of ease of molding and sintering, high electrical *and thermal* conductivity, relatively high melting points and ease of fabrication such as machining. However, the present invention is not necessarily limited to the inclusion of copper powder, the inclusion of other substances producing equivalent results also being possible as indicated by the following Examples 5 and 6.

EXAMPLE 5

50 percent of Ni powder and 50 percent of Mo powder were thoroughly mixed by means of a ball mill and then compression molded. The molded article was then sintered for one hour at 1,200 degrees C. in an atmosphere of hydrogen gas, and the sintered material was then machined into a cathode. As a result of using this electrode, the intensities of the [spectrum] *spectral* lines of the Ni and Mo were substantially equal, and satisfactory results were obtained. *In this example, the molybdenum provides sufficient electrical and thermal conductivity and the nickel assures easy machining.*

EXAMPLE 6

27.5 percent of Co powder, 36.3 percent of Mo powder, and 36.2 percent of Cr powder were thoroughly mixed in a ball mill and then compression molded. The molded article was then sintered for one hour at 1,200 degrees C in an atmosphere of hydrogen gas, and a cathode was made by machining the sintered material. As a result of using this electrode, the intensities of the spectrum lines of the three elements were substantially equal, and satisfactory results were obtained.

Since it is obvious that many changes and modifications can be made in the above described details without departing from the nature and spirit of the invention, it is to be understood that the invention is not to be limited to the details described herein except as set forth in the appended claims.

What we claim is:

1. A process of manufacturing a cathode for hollow cathode lamps in spectroscopic analyzers, which comprises mixing the powders of a high-melting elemental metal and a low-melting elemental metal, molding the mixture and sintering the same, thereby obtaining said high-melting metal in sponge form and the low-melting metal filling the interstices of said sponge; and further obtaining line spectra equal to the individual powdered metals used in kind and number; and forming a cathode from the sintered mixture.

2. A process of manufacturing a cathode for hollow cathode lamps in spectroscopic analyzers, which comprises mixing powdered copper with the powder of a low-melting elemental metal, molding the mixture and sintering the same, thereby obtaining said copper in sponge form and the low-melting metal filling the interstices of said sponge; and further obtaining line spectra equal to the individual powdered metals used in kind and number; and forming a cathode from the sintered mixture.

3. A process of manufacturing a cathode for hollow cathode lamps in spectroscopic analyzers, which comprises mixing the powders of a high-melting elemental metal, selected from the group consisting of copper, iron, nickel, cobalt and chromium, with powders of a low-melting elemental metal selected from the group consisting of lead, tin and zinc, and sintering the mixture, thereby obtaining the high-melting metal in sponge form and the low-melting metal filling the interstices of said sponge; and further obtaining line spectra equal to the individual powdered metals used in kind and number and forming a cathode from the sintered mixture.

4. A process of manufacturing a cathode for hollow cathode lamps in spectroscopic analyzers, which comprises mixing the powders of a high-melting elemental metal selected from the group consisting of copper, iron, nickel, cobalt and chromium, with powders of a low-melting elemental metal selected from the group consisting of lead, tin and zinc, in proportions of high-melting to low-melting metal of 50:50 to 85:15 percent; and sintering the mixture, thereby obtaining the high-melting metal in sponge form and the low-melting metal filling the interstices of said sponge; and further obtaining line spectra equal to the individual powdered metals used in kind and number; and forming a cathode from the sintered mixture.

*5. A process of manufacturing a cathode for hollow cathode lamps in spectroscopic analyzers which comprises mixing the powders of at least one high-melting elemental metal and at least one lower-melting elemental metal, molding the mixture, sintering the molded mixture, at such a temperature that the particles of the mixture adhere to each other while substantially maintaining the mixture state of the particles of the elemental metals thereby obtaining the high melting component in the sponge form and the lower-melting component filling the interstices of said sponge, and forming a cathode from the sintered mixture, said cathode being capable of emitting characteristic line spectra equal in kind and number to the individual powdered metals used in forming the cathode.*

*6. A process of manufacturing a cathode for hollow cathode lamps in spectroscopic analyzers which comprises mixing the powdered copper with the powder of at least one lower-melting elemental metal, molding the mixture, sintering the molded mixture, at such a temperature that the particles of the mixture are substantially maintained and the diffusion of the elemental metals is suppressed, thereby obtaining the high melting component in the sponge form and the lower-melting component filling the interstices of said sponge, and forming a cathode from the sintered mixture, said cathode being capable of emitting characteristic line spectra equal in kind and number to the individual powdered metals used in forming the cathode.*

*7. A process of manufacturing a cathode for hollow cathode lamps in spectroscopic analyzers which comprises mixing the powders of at least two elemental metals and including at least one elemental metal of high thermal and electrical conductivity, molding the mixture, sintering the mold mixture, at such a temperature that the particles of the mixture are substantially maintained to suppress extreme mutual diffusion of the elemental metals, and forming a cathode from the sintered mixture, said cathode being capable of emitting characteristic line spectra equal in kind and number to the individual powdered metals used in forming the cathode.*

*8. A process according to claim 7, wherein said elemental metal of high thermal and electrical conductivity is copper.*

*9. A process according to claim 7, wherein the powders of at least three elemental metals are used in forming the cathode.*

*10. A process according to claim 7, wherein said elemental metals are selected from the group consisting of copper, iron, nickel, chromium, gold, silver, palladium, bismuth, antimony, lead, tin, zinc, platinum, tantalum, titanium, manganese, boron, silicon, molybdenum and cobalt.*

*11. A process according to claim 9, wherein said elemental metals are selected from the group consisting of copper, iron, nickel, chromium, gold, silver, palladium, bismuth, antimony, lead, tin, zinc, platinum, tantalum, titanium, manganese, boron, silicon, molybdenum and cobalt.*

*12. A process according to claim 11, wherein at least one of the elemental metals employed is high-melting and is mixed with at least one lower-melting metal and is molded in the shape of a finished hollow cathode and, as a result of sintering, the high-melting elemental metal assumes a sponge form and the lower melting elemental metal fills the interstices of the sponge.*

*13. A process according to claim 12, wherein said elemental metal of high thermal and electrical conductivity is copper.*

*14. A process of manufacturing a cathode for hollow cathode lamps in spectroscopic analyzers which comprises mixing the powders of a plurality of elemental metals, molding the mixture, sintering the molded mixture at such a temperature that the particles of the mixture adhere to each other while extreme mutual diffusion of the elemental metals is relatively small, and forming a cathode from the sintered mixture, said cathode being capable of emitting characteristic line spectra of substantial strength and substantially equal in kind and number to the individual powdered metals used in forming the cathode.*

*15. A hollow cathodic emissive element for use in a spectroscopic analyzer comprising the shaped and sintered product of the mixture of a plurality of powders of elemental metal adhering to each other while keeping extreme mutual diffusion relatively small, said hollow cathodic emissive element being capable of emitting characteristic line spectra of substantial strength and equal in kind and number to the individual powdered metals used in forming the cathode.*

*16. A hollow cathodic element according to claim 15 wherein the powders of at least three elemental metals are used in forming the cathode.*

*17. A hollow cathodic element according to claim 16 wherein said elemental metals are selected from the group consisting of copper, iron, nickel, chromium, gold, silver, palladium, bismuth, antimony, lead, tin, zinc, platinum, tantalium, titanium, manganese, boron, silicon, molybdenum and colbat.*

*18. A hollow cathodic element according to claim 17 wherein at least one elemental metal is of high thermal and electrical conductivity.*

*19. A cathodic element according to claim 18 wherein at least one of the elemental metals employed is high-melting and is mixed with at least one lower-melting metal, said mixture being molded in the shape of a finished hollow cathode and, as a result of sintering, the high-melting elemental metal assumes a sponge form and the lower melting elemental metal fills the interstices of the sponge.*

*20. A cathodic element according to claim 19 wherein said elemental metal of high thermal and electrical conductivity is copper.*

*21. A hollow cathodic emissive element according to claim 15, wherein the powders of the elemental metals adhere to each other while substantially maintaining the mixture state of elemental metals.*

*22. A hollow cathodic element according to claim 19, wherein the powders of the high-melting and low-melting elemental metals adhere to each other while substantially maintaining the mixture state of the elemental metals.*

*23. A hollow cathodic emissive element according to claim 15, characterized in that the entire cathode body forming the element essentially consists of said shaped and sintered product of a mixture of a plurality of powders of said elemental metals.*

*24. A hollow cathodic emissive element for use in a spectroscopic analyzer, comprising the sintered product having a hollow shape and formed of the mixture of a plurality of powders of elemental metals adhering to each other to have a mechanical strength sufficient during use while keeping extreme mutual diffusion relatively small, said cathodic emissive element being capable of emitting characteristic line spectra of a substantial strength equal in kind and number to the individual powdered metals used in forming the cathode.*

*25. A hollow cathodic emissive element for use in a spectroscopic analyzer, comprising the sintered product of the mixture of a plurality of powders of elemental metals adhering to each other to provide sufficient mechanical strength while minimizing extreme mutual diffusion, wherein each amount of the powders of the elemental metals are selected such that the intensities of characteristic line spectra of the elemental metals are substantially equal to each other and equal in kind and number to the individual elemental metals used in forming the cathode.*

References Cited

The following references, cited by the Examiner, are of record in the patented file of the patent or the original patent.

UNITED STATES PATENTS

| | | | |
|---|---|---|---|
| 2,377,882 | 6/1945 | Hensel | 29—182.1 |
| 2,390,595 | 12/1945 | Larsen | 29—182.1 |

| | | | |
|---|---|---|---|
| 3,125,441 | 3/1964 | Lafferty | 75—200 XR |
| 1,205,080 | 7/1916 | Baumann. | |
| 2,914,402 | 11/1959 | Becker et al. | |

FOREIGN PATENTS

| | | |
|---|---|---|
| 705,738 | 5/1941 | Germany. |
| 12,158 | 1902 | Great Britain. |

OTHER REFERENCES

"Treatise on Powder Metallurgy," vol. II, Goetzal, pp. 191–195; Interscience Publishers, N.Y., 1950.

BENJAMIN R. PADGETT, Primary Examiner

A. J. STEINER, Assistant Examiner

U.S. Cl. X.R.

29—182; 75—200, 208